Feb. 21, 1956    C. H. MEILE    2,735,314
SECTIONAL CRANKSHAFT
Filed Jan. 23, 1952
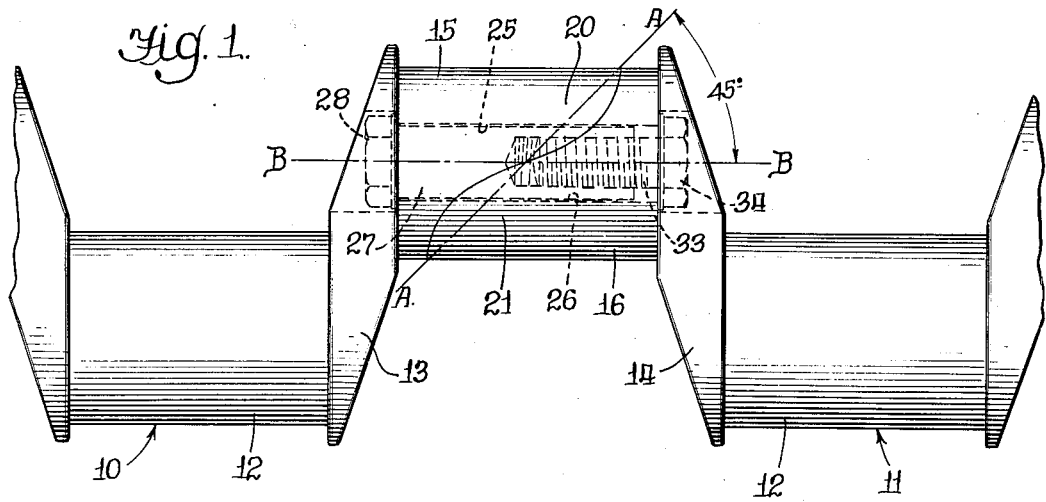
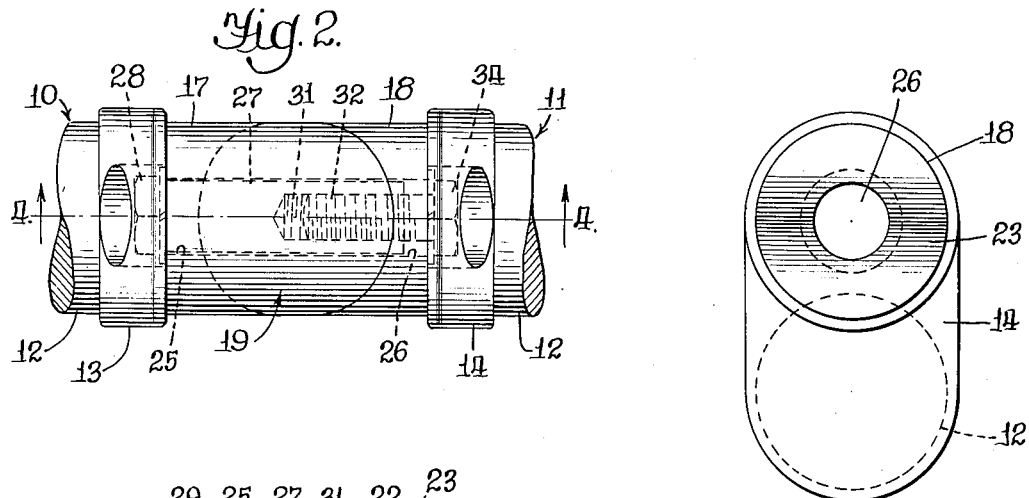
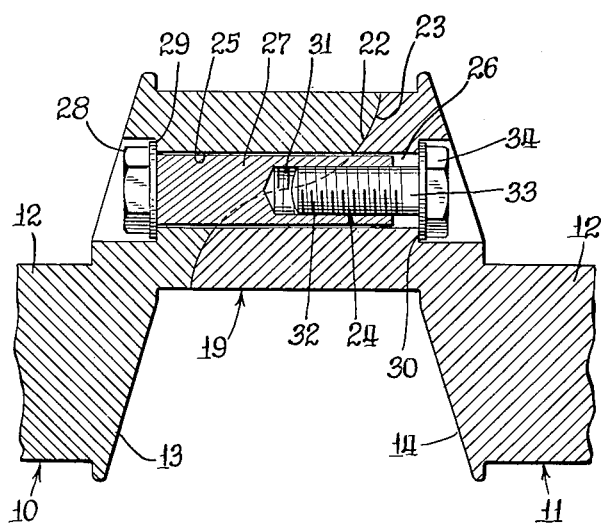
INVENTOR.
Carl H. Meile
BY
Paul O. Pippel
Atty.

United States Patent Office 2,735,314
Patented Feb. 21, 1956

2,735,314

SECTIONAL CRANKSHAFT

Carl H. Meile, Fort Wayne, Ind., assignor to International Harvester Company, a corporation of New Jersey Application January 23, 1952, Serial No. 267,868

1 Claim. (Cl. 74—598)

This invention relates to sectional crankshafts for internal combustion engines or the like and more particularly to the connecting rod journal construction of sectional crankshafts.

It is oftentimes desirable, in the manufacture of internal combustion engines, to construct the engine crankshaft in sections rather than to make the same out of a single forging or casting in order to simplify the machining operations. Furthermore, it is possible to use connecting rods provided with solid bearings as distinguished from split bearings in conjunction with sectional crankshafts. The use of connecting rods having solid bearings as contrasted with split bearings will greatly increase the durability of the engine by distributing the bearing stresses evenly about the bearing rather than concentrating the same at the points where the split bearing halves are connected together. While the above mentioned advantages of sectional crankshafts over conventional one piece crankshafts are well known, sectional crankshafts are not widely used since, heretofore, the means for splicing or joining the sections together was far too costly for ordinary installations and outweighed the advantages or did not have the sturdiness and rigidity needed for long periods of trouble-free operation. Therefore, this primary objective of the present invention is the provision of a novel sectional crankshaft connecting rod journal construction by which the advantages of sectional crankshafts enumerated above are obtained by utilizing the construction without sacrificing the durability of the shaft and increasing the cost of manufacture to a point where it becomes prohibitive.

Another object is to provide a pair of journal portions which are clamped together to form a cylindrical journal; the engaging surfaces of the journal portions lie in complementary sinusoidal planes.

Still another object is the provision of journal portions which have engaging surfaces in the form of complementary sinusoidal contours which are contained in a plane inclined to the longitudinal axis of the journal.

The foregoing and other important objects and desirable features inherent in and encompassed by the invention, together with many of the purposes and uses thereof, will become readily apparent from a reading of the ensuing description in conjunction with the annexed drawings, in which, Figure 1 is a side elevational view of a portion of a sectional crankshaft showing the connection between a pair of sections;

Figure 2 is a plan view of the connection between a pair of sections;

Figure 3 is an end view of one of the sections; and

Figure 4 is a sectional view taken substantially along line 4—4 of Figure 2.

Referring to the drawings, wherein like reference characters designate like elements throughout the various views, there is shown portions of a pair of sections 10, 11 of a sectional crankshaft. While only portions of two sections are illustrated, it is to be understood that as many sections could be assembled together in the manner to be described hereinafter as desired since the invention lies in the means for connecting sections of a sectional crankshaft together.

Each section 10, 11 includes a conventional solid cylindrical journal 12. A crank arm 13, 14 is integrally forged or cast with the journal 12 and extends substantially normally with respect to the longitudinal axis of the journal. Referring to crank arm 13 which is a part of the section 10 disposed on the left as viewed in Figure 1 it will be noted that a journal portion 15 projects from the crank arm 13 and is integrally formed therewith. A similar journal portion 16 extends from the crank arm 14 of section 11. The outer surfaces 17, 18 of the journal portions 15, 16 are circular throughout their lengths whereby a cylindrical journal, designated by numeral 19, results when the free ends 20, 21 of the journal portions are caused to abut each other. The journal 19 rotatably supports one end of a connecting rod or rods (not shown).

The engaging surfaces 22, 23 of the free ends 20, 21, respectively, are machined to have complementary sinusoidal flat contours. The surfaces 22, 23 are sine generated about a flat neutral plane designated by line A—A of Figure 1. It will be noted that the neutral plane is inclined to the longitudinal axis B—B of the cylindrical journal 19 at an angle of approximately 45°.

In order to fasten the sections 10 and 11 together and maintain the engaging surfaces 22 and 23 in proper abutting relationship a clamping structure 24 is provided. A bore 25 is formed in the crank arm 13 and journal portion 15 which is longitudinally alignable with a similar bore 26 extending through the crank arm 14 and journal portion 16 for receiving the clamping structure 24. The clamping structure 24 includes a cylindrical member 27 acting as a pilot having an outside diameter slightly less than the bores 25 and 26 and an enlarged head portion 28. The head portion 28 abuts an annular shoulder 29 formed by counterboring one end of the bore 25. A similar shoulder 30 is provided in the crank arm 14. The cylindrical member 27 is of sufficient length to extend into the bore 26 when the head portion 28 bears against the shoulder 29. The end of the cylindrical member 27 opposite the head portion 28 has a threaded recess 31 formed therein for receiving one end 32 of a lock bolt 33. The head portion 34 of the bolt 33 seats against the shoulder 30 provided in the crank arm 14. From the foregoing it will be obvious that the bolt 33 can be screwed into the recess 31 to tightly clamp the journal portions 15 and 16 together.

In assembling the two sections 10 and 11 the free ends 20, 21 are brought together until the full sinusoidal surface 22 of one journal portion abuts the complementary sinusoidal surface 23 of the other journal portion. The cylindrical member 27 is then inserted in the bore 25 and (as best shown in Figure 1, partially extends into the bore 26. The lock bolt 33 is positioned in the bore 26 and threaded into the recess 31 to clamp the journal portions 15 and 16 together. It will be obvious that when the sine generated surfaces 22, 23 are held in abutting relationship relative movement of one journal portion about the longitudinal axis of the journal 19 with respect to the other journal portion is prevented. By inclining the plane A—A, about which the sinusoidal surfaces 22, 23 are oriented, at an angle of approximately 45°, a large area of contact between the mating parts is obtained to distribute the load applied to the journal portions over a greater area. Furthermore, the mating parts are easily guided together when assembling the same and can be wedged or clamped together tightly by virtue of mating sinusoidal surfaces 22, 23 formed on the free ends 20, 21, respectively.

The embodiment of the invention chosen for the purposes of illustration and description herein is that preferred as the result of selective tests based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claim.

What is claimed is:

A crankshaft connecting said rod journal construction, comprising a first crank arm, a first journal portion integral therewith and having a circular outer surface, said journal portion having a free end; a second crank arm, a second journal portion integral therewith and having a circular outer surface, said second journal portion having a free end adapted to abut the free end of said first journal portion to form a cylindrical journal, the abutting surfaces of said free ends having complementary sine generated contours generated from a single flat plane disposed at an angle of approximately 45° with respect to the longitudinal axis of said cylindrical journal, the longitudinal axis of said cylindrical journal intersecting said flat plane at a point spaced substantially midway between said first and second crank arms; and clamping means for maintaining said journal portions in abutting relationship.

References Cited in the file of this patent

UNITED STATES PATENTS

| | | |
|---|---|---|
| 318,056 | Trump | May 19, 1885 |
| 1,855,939 | Collins | Apr. 26, 1932 |
| 2,019,460 | Mahan | Oct. 29, 1935 |

FOREIGN PATENTS

| | | |
|---|---|---|
| 684 of 1885 | Great Britain | Jan. 17, 1885 |
| 11,613 of 1904 | Great Britain | May 20, 1904 |
| 630,415 | Germany | July 21, 1935 |
| 486,491 | Great Britain | June 3, 1938 |